United States Patent
Pathak (10) Patent No.: US 9,112,891 B2
(45) Date of Patent: Aug. 18, 2015

(54) REMOTE FIRMWARE MANAGEMENT FOR ELECTRONIC DEVICES

(75) Inventor: Rabindra Pathak, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 2482 days.

(21) Appl. No.: 11/670,875

(22) Filed: Feb. 2, 2007

(65) Prior Publication Data

US 2008/0189693 A1     Aug. 7, 2008

(51) Int. Cl.
*G06F 15/16* (2006.01)
*H04L 29/08* (2006.01)
*G06F 9/445* (2006.01)

(52) U.S. Cl.
CPC .............. *H04L 67/125* (2013.01); *G06F 8/65* (2013.01); *H04L 67/34* (2013.01)

(58) Field of Classification Search
CPC .......................................................... G06F 8/65
USPC .................. 709/221; 717/168; 358/1.15, 1.16
See application file for complete search history.

(56) References Cited

U.S. PATENT DOCUMENTS

| | | | |
|---|---|---|---|
| 5,805,803 A | 9/1998 | Birrell et al. | |
| 6,055,632 A | 4/2000 | Deegan et al. | |
| 6,167,448 A | 12/2000 | Hemphill et al. | |
| 6,199,194 B1 * | 3/2001 | Wang et al. | 717/118 |
| 6,341,143 B1 | 1/2002 | Nelson et al. | |
| 6,349,336 B1 | 2/2002 | Sit et al. | |
| 6,360,362 B1 | 3/2002 | Fichtner et al. | |
| 6,389,464 B1 | 5/2002 | Krishnamurthy et al. | |
| 6,526,092 B1 | 2/2003 | Nelson et al. | |
| 6,553,422 B1 | 4/2003 | Nelson | |
| 6,671,802 B1 | 12/2003 | Ott | |
| 6,772,096 B2 | 8/2004 | Murakami et al. | |
| 6,928,108 B2 | 8/2005 | Nelson et al. | |
| 6,930,785 B1 | 8/2005 | Weyland et al. | |
| 6,971,095 B2 | 11/2005 | Hirai et al. | |
| 6,976,062 B1 | 12/2005 | Denby et al. | |
| 6,976,163 B1 * | 12/2005 | Hind et al. | 713/156 |
| 7,069,452 B1 * | 6/2006 | Hind et al. | 713/1 |
| 7,093,244 B2 | 8/2006 | Lajoie et al. | |
| 7,197,634 B2 * | 3/2007 | Kruger et al. | 713/1 |

(Continued)

FOREIGN PATENT DOCUMENTS

| | | |
|---|---|---|
| EP | 0632629 A1 | 4/1995 |
| GB | 2348987 A | 10/2000 |

(Continued)

OTHER PUBLICATIONS

PTO office action dated May 28, 2009, re U.S. Appl. No. 11/607,604.

(Continued)

*Primary Examiner* — Douglas Blair
(74) *Attorney, Agent, or Firm* — Larry K. Roberts (57) ABSTRACT

A method and system for firmware updating for one or more electronic devices connected on a user network. A management gateway may be connected on the network, configured to control all firmware update activity for the one or more electronic devices. In an exemplary application, the electronic devices may be multifunction peripheral devices. An electronically accessible firmware repository for storing firmware updates is maintained. The management gateway may establish a firmware update activity schedule for each electronic device.

23 Claims, 5 Drawing Sheets

(56) References Cited

U.S. PATENT DOCUMENTS

| | | | |
|---|---|---|---|
| 7,213,263 B2 | 5/2007 | Makineni et al. | |
| 7,280,529 B1 | 10/2007 | Black et al. | |
| 7,349,682 B1 | 3/2008 | Bennett et al. | |
| 7,376,666 B2 * | 5/2008 | Borchers | |
| 7,440,465 B2 | 10/2008 | Park | |
| 7,444,400 B2 | 10/2008 | Hara et al. | |
| 7,447,775 B1 | 11/2008 | Zhu et al. | |
| 7,448,080 B2 | 11/2008 | Karjala et al. | |
| 7,814,480 B2 * | 10/2010 | Sakuda et al. | 717/173 |
| 8,115,944 B2 * | 2/2012 | Zhang et al. | 358/1.15 |
| 8,266,260 B2 * | 9/2012 | Pathak et al. | 709/221 |
| 2002/0138567 A1 * | 9/2002 | Ogawa | 709/203 |
| 2002/0184301 A1 | 12/2002 | Parent | |
| 2002/0188934 A1 | 12/2002 | Griffioen et al. | |
| 2002/0194313 A1 * | 12/2002 | Brannock | 709/220 |
| 2003/0009697 A1 | 1/2003 | Uehata et al. | |
| 2003/0018491 A1 | 1/2003 | Nakahara et al. | |
| 2003/0041137 A1 | 2/2003 | Horie et al. | |
| 2003/0061355 A1 | 3/2003 | Yang et al. | |
| 2003/0086107 A1 | 5/2003 | Johnson et al. | |
| 2003/0097427 A1 | 5/2003 | Parry | |
| 2003/0154471 A1 * | 8/2003 | Teachman et al. | 717/171 |
| 2003/0217193 A1 * | 11/2003 | Thurston et al. | 709/321 |
| 2004/0093597 A1 | 5/2004 | Rao et al. | |
| 2004/0103220 A1 * | 5/2004 | Bostick et al. | 709/253 |
| 2004/0148379 A1 * | 7/2004 | Ogura | 709/223 |
| 2004/0150851 A1 * | 8/2004 | Sato | 358/1.13 |
| 2004/0210894 A1 | 10/2004 | Zarco | |
| 2005/0108700 A1 | 5/2005 | Chen et al. | |
| 2005/0114226 A1 | 5/2005 | Tripp et al. | |
| 2005/0141025 A1 * | 6/2005 | Hanada | 358/1.15 |
| 2005/0155029 A1 * | 7/2005 | Nguyen et al. | 717/168 |
| 2005/0162689 A1 * | 7/2005 | Roztocil | 358/1.15 |
| 2005/0206960 A1 * | 9/2005 | Shibata | 358/402 |
| 2005/0223372 A1 * | 10/2005 | Borchers | 717/168 |
| 2005/0272417 A1 | 12/2005 | Liu | |
| 2006/0010437 A1 * | 1/2006 | Marolia | 717/168 |
| 2006/0064741 A1 | 3/2006 | Terao | |
| 2006/0080734 A1 | 4/2006 | Kim et al. | |
| 2006/0085526 A1 | 4/2006 | Gulland | |
| 2006/0103588 A1 * | 5/2006 | Chrisop et al. | 345/2.1 |
| 2006/0109505 A1 * | 5/2006 | Ha et al. | 358/1.15 |
| 2006/0168178 A1 | 7/2006 | Hwang et al. | |
| 2006/0174242 A1 * | 8/2006 | Zhu et al. | 717/172 |
| 2006/0209708 A1 * | 9/2006 | Nakamura | 370/252 |
| 2006/0221380 A1 * | 10/2006 | Pretz et al. | 358/1.15 |
| 2006/0235890 A1 | 10/2006 | Vigil | |
| 2006/0280127 A1 | 12/2006 | Mizuno et al. | |
| 2007/0080776 A1 * | 4/2007 | Suwabe et al. | 340/5.2 |
| 2007/0159650 A1 * | 7/2007 | Takamatsu et al. | 358/1.15 |
| 2007/0204045 A1 | 8/2007 | Shima | |
| 2007/0211632 A1 | 9/2007 | Song et al. | |
| 2008/0028385 A1 * | 1/2008 | Brown et al. | 717/170 |
| 2008/0052383 A1 | 2/2008 | O'Shaughnessy et al. | |
| 2008/0069122 A1 | 3/2008 | Matsuoka et al. | |
| 2008/0127159 A1 * | 5/2008 | Regenmorter | 717/168 |
| 2008/0178278 A1 | 7/2008 | Grinstein et al. | |
| 2008/0189693 A1 | 8/2008 | Pathak | |
| 2008/0189781 A1 | 8/2008 | Pathak et al. | |
| 2009/0072991 A1 | 3/2009 | Hayashi et al. | |
| 2010/0202450 A1 * | 8/2010 | Ansari et al. | 370/389 |

FOREIGN PATENT DOCUMENTS

| | | |
|---|---|---|
| JP | 2002063035 | 2/2002 |
| JP | 2002182940 | 6/2002 |
| JP | 2004139572 | 5/2004 |
| JP | 2005196462 | 7/2005 |
| JP | 2004139572 A | 3/2006 |
| JP | 2006-243905 | 9/2006 |
| WO | WO0017749 A1 | 3/2000 |
| WO | WO02084484 A2 | 10/2002 |

OTHER PUBLICATIONS

PTO office action dated Jan. 7, 2010, re U.S. Appl. No. 11/670,604.

* cited by examiner

REMOTE FIRMWARE MANAGEMENT FOR ELECTRONIC DEVICES

BACKGROUND

Many electronic devices today include firmware. Firmware may be a software program or set of instructions programmed on a hardware device. The firmware may provide instructions which are executed to determine how the device operates. The firmware may be stored in programmable memory of a hardware device. As updated firmware is developed, the firmware stored in a device may be replaced or updated.

Existing solutions to manage the firmware of electronic devices such, for example, multifunction printing (MFP) devices, have many limitations. MFP devices may perform imaging (scanning), printing, copying and facsimile machine functions, or some subset of these functions. There is a lack of a mechanism to update the firmware for a group of MFP devices or to schedule an update for a future time period.

SUMMARY OF THE DISCLOSURE

A method and system are described for firmware updating for one or more electronic devices connected on a user network. A management gateway may be connected on the network, configured to control all firmware update activity for the one or more electronic devices. In an exemplary application, the electronic devices may be multifunction printing devices. An electronically accessible firmware repository for storing firmware updates is maintained. The management gateway may establish a firmware update activity schedule for each electronic device. In another embodiment, a version matrix for the electronic device may be checked before performing an update.

DETAILED DESCRIPTION

In the following detailed description and in the several figures of the drawing, like elements are identified with like reference numerals. The figures are not to scale, and relative feature sizes may be exaggerated for illustrative purposes.

Figure 1:
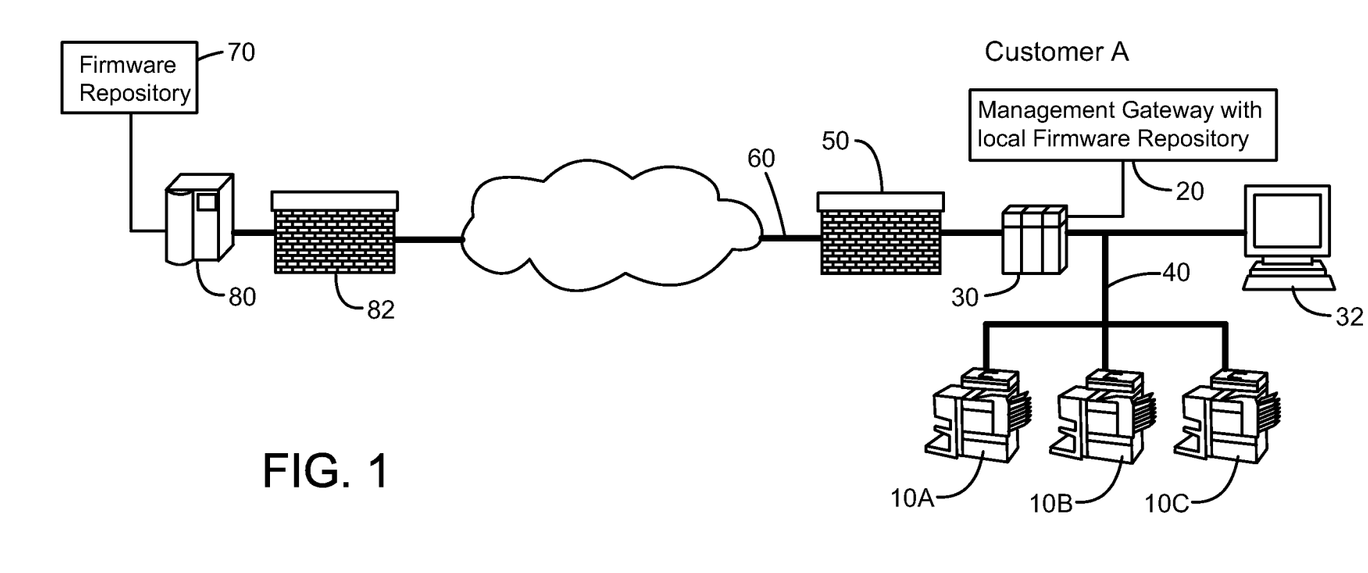
FIG. 1 diagrammatically depicts an exemplary embodiment of an operating environment of a system for updating firmware for a device connected on a network.

An exemplary embodiment of a method and system for managing firmware (FW) remotely includes a management gateway and a firmware repository. FIG. 1 diagrammatically depicts an exemplary operating environment. In an exemplary embodiment a management gateway 20 is implemented as a software application installed on a server 30 running at a customer site. The server 30 may be connected on the customer's intranet or network 40. Also connected on the customer's network 40 are several electronic devices 10A, 10B, 10C, which in an exemplary application may be MFPs. The number of electronic devices or MFPs connected at a customer site will of course depend on the customer's particular circumstances, and may vary from one to hundreds or more. The method for updating firmware is not limited to MFP devices, and may be applicable to any device which has updatable firmware.

A connection may be made through a firewall 50 at the customer's network through an internet connection 60 to a firmware repository 70, which may reside on a remote server 80, which may also be connected to the internet through a firewall 82. In an exemplary embodiment, the firmware repository 70 may provide a mechanism for storing and distributing firmware releases, and the management gateway 20 may fetch the firmware releases or firmware updates from the firmware repository. MFPs may have electronic controllers and may be networkable, so that the MFPs receive commands from an external device, e.g. the management gateway, for changing configuration, updating firmware, pulling a firmware update from a repository upon command, accepting a pushed firmware update from an external source, etc. The management gateway may communicate with the MFP using SNMP, SOAP or any other protocol configured in the management gateway 20. The simple network management protocol (SNMP) forms part of the internet protocol suite as defined by the Internet Engineering Task Force (IETF). SNMP is used by network management systems to monitor network-attached devices for conditions that warrant administrative attention. It includes a set of standards for network management, including an Application Layer protocol, a database schema, and a set of data objects. SOAP represents "Simple Object Access Protocol," a lightweight XML-based messaging protocol used to encode the information in Web service request and response messages before sending them over a network. SOAP messages are independent of any operating system or protocol and may be transported using a variety of Internet protocols, including SMTP, MIME, and HTTP.

Figure 2:
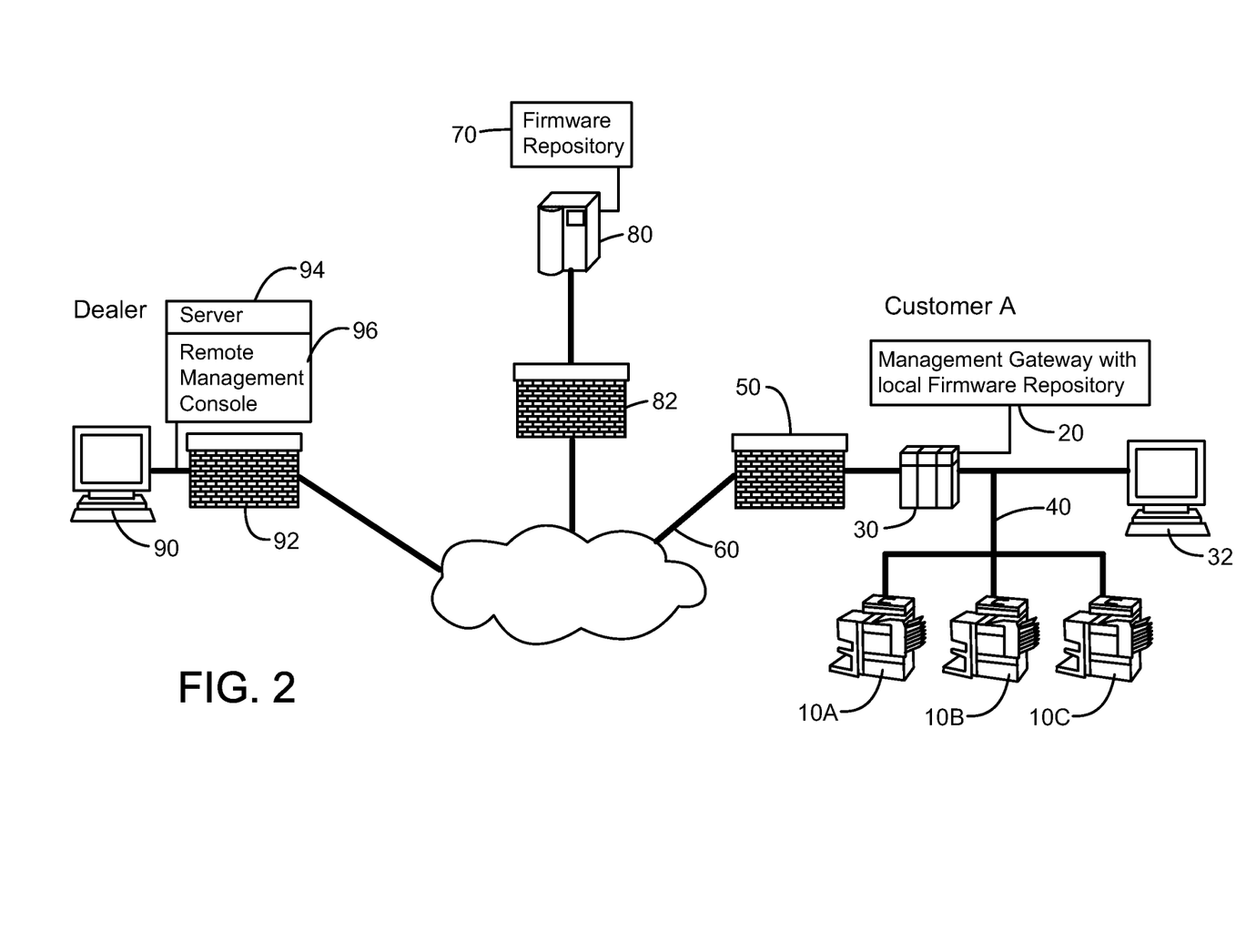
FIG. 2 diagrammatically depicts an alternate embodiment of an exemplary operating environment of a system for updating firmware for a device connected on a network.

In an exemplary embodiment, either a dealer or the customer may use the management gateway 20 to perform a firmware update. In an exemplary illustrative application, a manufacturer may distribute electronic devices such as MFPs through dealers, who in turn sell the MFPs to customers. The dealers may support and maintain the MFPs for their customers. A dealer typically may have multiple customers. FIG. 2 is a schematic diagram illustrating an exemplary operating environment in which either the dealer or the customer may use a management gateway 20 to perform a firmware update. A terminal 90 at a dealer's site may be connected through a firewall at the dealer to the internet 60. Also connected at the dealer's site may be a server 94, on which a software application 96 may be running. The software application program is referred to as a remote management console 96. A local firmware repository may be located on server 30 with the management gateway 20, and connected on the customer's network 40 to a plurality of MFP devices 10A, 10B, 10C. A remote firmware repository may be located at a remote site, protected by a firewall 82, and accessible to the management gateway 20. In an exemplary embodiment, the firmware repository may be accessed as a web site is accessed through either a web browser or a program such as a gateway. In non-limiting examples, the firmware depository may be installed on a web server, or set up as a web site. In an exemplary embodiment, access to the firmware repository may be secured using one of many options, such as username/password, Windows virtual directory access control, etc. The management gateway 20 may act as a central control system for firmware update management. In an exemplary embodiment, the user, i.e. either the dealer or the customer, need not access the MFP devices directly. The user may access the management gateway 20, e.g. through a terminal or pc 32 connected on the intranet 40, in order to configure and schedule the firmware updates for MFP devices. The management gateway in turn ensures that firmware updates for the intended MFPs are successfully initiated at the specified time. The management gateway 20 may be used to update the firmware of MFPs deployed inside the protected network of a customer from within the customer premises or from a dealer location.

In an exemplary embodiment, a dealer may install the management gateway in the customer network. In other embodiments, the customer may perform the installation. In an exemplary embodiment, the dealer may have direct access to only the management gateway, and not to other devices or applications installed on the customer network. The management gateway in turn may access the configured MFPs in the customer's environment. The rest of the customer network including the customer MFPs are protected from the direct access of the dealer. The dealer will not be able to access any part of the customer network other than the management gateway. Access to the management gateway may be granted only to the intended dealer and is protected using industry-standard security protocols. The customer may choose to deny access to the dealer.

An exemplary embodiment of a management system may provide the remote management console 96 and the management gateway 20 with a persistent secure virtual tunnel through which the remote management console can communicate with the management gateway. In an exemplary embodiment, the secure virtual tunnel may be an authenticated and encrypted communication link which is persistent or quasi-persistent, i.e., stays on after an exchange of messages. This secure virtual tunnel may provide a private and secure channel of communication between remote management console and management gateway over a public and non-secure medium such as the internet. To further enhance the security, the secure virtual tunnel also ensures that dealer can not access any other part of customer network except the Management Gateway. In an exemplary embodiment, the management gateway 20 may maintain a white list of all the devices which the remote management console is to be permitted to control remotely. Only the management gateway will access those devices. If the remote management console were to ask to control any other devices remotely on the customer intranet, the management gateway would refuse the request.

There are several ways in which a persistent secure virtual tunnel can be established, and which option is used in a particular customer scenario is a function of ease of deployment, scalability and level of security needed. In an exemplary embodiment, the URI scheme known as HTTPS may serve as a primary mechanism to establish a persistent secure virtual tunnel. HTTPS is well known in the art, and refers to Hypertext Transfer Protocol over Secure Socket Layer, or HTTP over SSL. HTTPS is a Web protocol built into browsers that encrypts and decrypts user page requests as well as the pages that are returned by a Web server. HTTPS uses the Secure Socket Layer (SSL) as a sub layer under the HTTP application layering. HTTPS uses port 443 instead of HTTP port 80 in its interactions with the lower layer, TCP/IP.

In an exemplary embodiment using HTTPS, the management gateway 30 may initiate an outgoing connection to the remote management console 96, and the secure tunnel is established after mutual authentication based on digital certificates. In an exemplary embodiment, the dealer may open his HTTPS port in order for the remote management console 96 to communicate with the management gateway 20 installed at the customer site. Then the management gateway 20 authorizes the remote management console 96 for remote management of the MFP devices 10A, 10B, 10C. At the successful end of an authorization step, a secure tunnel is in place.

An exemplary embodiment of a method and system may provide one or more of the following firmware management capabilities to dealers and customers:

Automated firmware updates for one or more MFP devices. A user may access a management gateway and configure the group of devices for firmware update, location of firmware in the firmware repository and the schedule of the update. The update activity can be scheduled for a future time period. The scheduling can be done for each MFP separately or for a group of devices together. The management gateway may in turn ensure that firmware updates are initiated at the specified time for each configured MFP. If the firmware update fails, then there may be retries and an alert notification may be sent to the registered user. Status of updates may be logged for future reference. A user may also be able to modify or cancel the scheduled update.

Managing firmware update for devices spread over protected networks of multiple customers. A dealer may manage the firmware of MFP devices installed across protected networks of multiple customers through access provided by a management gateway installed on each customer's network.

Checking the version matrix before performing updates. A version matrix may be maintained to ensure that the firmware for a subcomponent of an MFP is updated only if it is compatible with the firmware of other subcomponents. A management gateway may check an MFP version matrix to decide if the new version of firmware for a subcomponent is compatible with existing firmware of other subcomponents. This may be applicable for devices that support multiple components and each component has a separate firmware with dependency on firmware of other components.

Push and pull model. In a pull model, the MFPs can pull the firmware from a source location. A push model may be supported in which the management gateway may push the firmware to the MFP from an external system.

Security and access control. Multiple levels of security may be provided to ensure that only the authorized personnel can access the firmware update capability. This may include, for example, username/password based access control to MFPs, HTTPS/SSL connections from the dealer to the management gateway, and mutual authentication using digital certificates, and HTTPS connection between management gateway and MFP.

Notifying and alerting the user for the status of firmware update. Users may register to the management gateway for notifications and alerts. The management gateway may notify the users of the status of updates. In case of failures, the user may also get alert messages.

Logging of Firmware update activities. Status of all the firmware update activities may be logged for future reference.

Reliable Update and Notification. Once the firmware update starts, a mechanism may be provided to ensure that firmware is updated successfully. If firmware update fails, then retries may be made to ensure that the update is successful. If retries also fail then the user may be notified.

Thus, in an exemplary embodiment, a method and system may be provided to automate the firmware update process for MFP devices. A firmware update may be remotely managed from within the premises of the customer where the MFP is deployed or from the dealer location. From the dealer location, a user may access only the management gateway and not any other part of the customer network. Remote management of firmware updates may be enabled with a software application, the management gateway. A management gateway application may typically be installed inside the customer firewall and it can manage the firmware of MFPs in the network. A management gateway uses a firmware repository to obtain the firmware which needs to be updated in the MFPs. The firmware repository provides a mechanism to store and distribute the new firmware releases.

The firmware update process in an exemplary embodiment may be driven by the management gateway. Individual MFPs wait for management gateway instructions before they initiate the firmware update.

Figures 3, 3A:
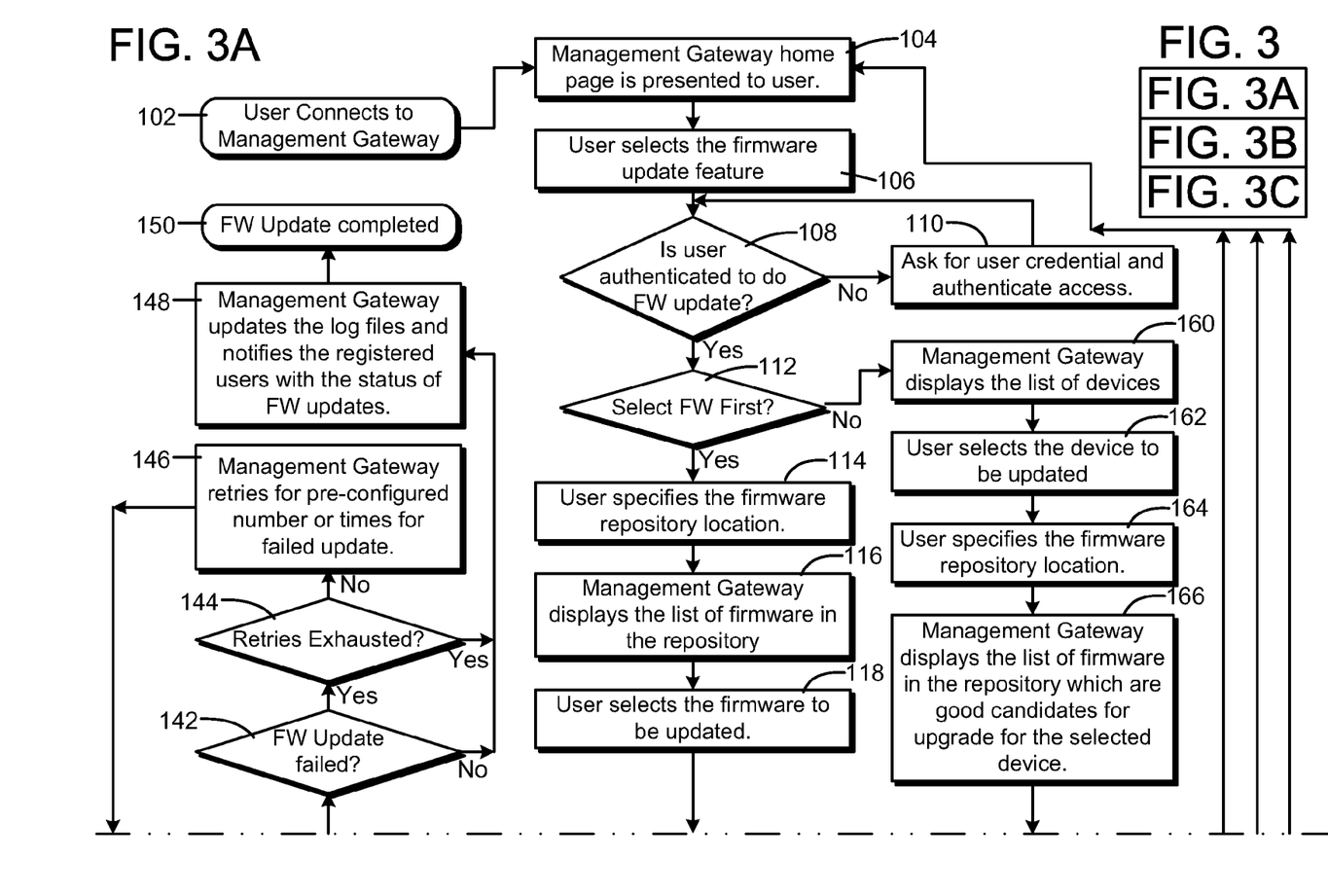
FIGS. 3A-3C depict a flow diagram illustrating an exemplary embodiment of a method for firmware updating.
Figure 3B:
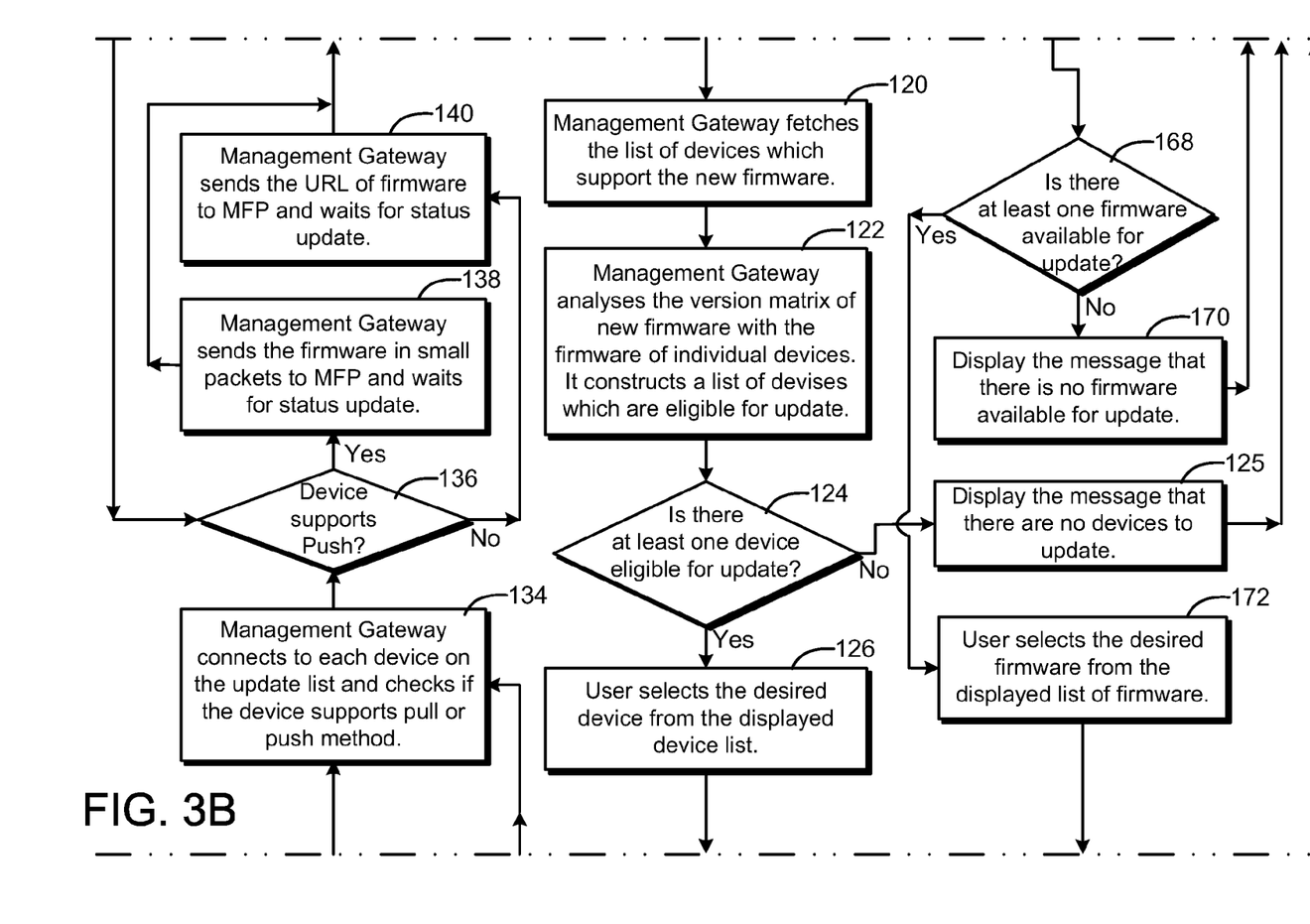
Figure 3C:
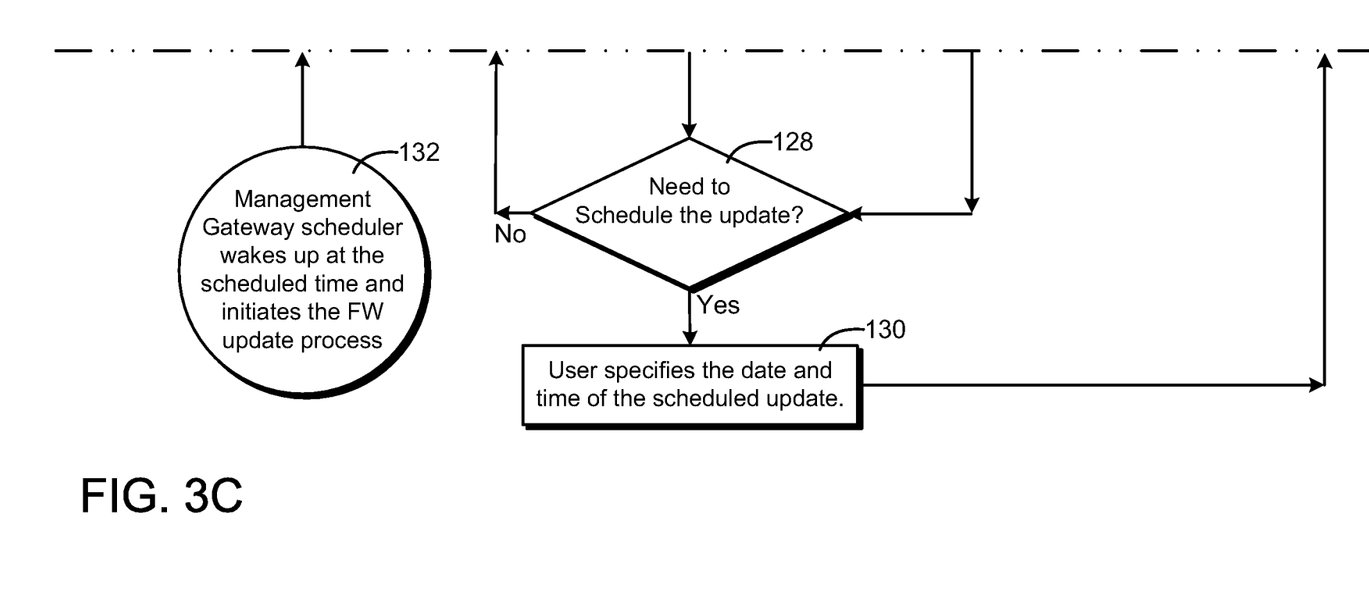

FIG. 3 is a flow diagram illustrating an exemplary embodiment of a method for firmware (FW) updating. This exemplary process of FW updating begins at 102 when a user logs in the management gateway. This may be done by connecting to the management gateway at 104 and selecting the firmware update feature at 106. If at 108 the user is not authenticated to do FW updating, the user will be requested at 110 to provide a user credential so that authentication may take place.

Once the user is authenticated for FW updating, the user is prompted at 112 to make a selection of either a "firmware first" or a "device first" method. In this exemplary embodiment, for the "firmware first" method, the user first selects the firmware and then the management gateway displays the list of devices compatible with that firmware. Then the user selects one or more devices from the list and the management gateway takes care of updating the selected devices with selected firmware. For the "device first" method, the user first selects the device to be updated and the management gateway then displays the list of firmware available for the update. Then user selects the desired firmware and the management gateway updates the selected firmware for that device.

For the "firmware first" method, at 114 the user specifies the location of the firmware repository. There may be more than one firmware repository available. In an exemplary embodiment, only one repository will be active for the management gateway at a given time. The management gateway may choose any one repository at a time. It could be either local or remote repository. The location of the firmware repository may be specified by using a URI (Universal Resource Identifier), which could be a URL, a directory path on local server or on the network, by way of example. At 116, the management gateway fetches the information about the firmware from the specified firmware repository, which may include in an exemplary embodiment the version number, family of devices supported and an associated version matrix, with the firmware. Then at 118, the user selects the desired firmware for the update from the displayed list of firmware. Once the user makes a selection of the firmware, the management gateway displays a list of devices which can be upgraded with the selected firmware at 120 and 122. If no devices are eligible for firmware updating, a message is displayed by the management gateway at 125. If at 124 there is at least one device eligible for firmware update, the user selects at 126 which devices are to be updated with the selected firmware. The user can also choose at 128 to do the update at that moment or schedule the update at future time period (130). At the scheduled time, management gateway will wake up and send the update request to all the required MFPs (step 132). 132 denotes a scheduler function, which "wakes up" when a scheduled job is due. At that time, it looks for all the jobs which are scheduled and starts the one which needs to be started at that time. Once in step 130 the job is scheduled, the scheduler at 132 will start the job at the appropriate time.

At 134, the management gateway connects to each device on the update list, and determines whether the device supports the push method or the pull method. In an exemplary embodiment, the management gateway can use either the push model or the pull model to make the firmware available to a MFP device. If at 136, the device supports the push model, then at 138, it gets the firmware file and sends it to MFP device. In the pull model, at 140, the management gateway provides the MFP with the location of the firmware file and the MFP fetches the file from that location. The management gateway receives the status of the firmware update, and if the update fails, retries the firmware update until the update succeeds or a predetermined number of retries has been attempted (steps 142, 144, 146). The management gateway logs the status and sends notification to registered users for the status and alerts if the update fails (step 148).

For the "device first" method, in an exemplary embodiment, most of the processing may be the same as in the "firmware first" method. In the "device first", the method guides the user to select the device first at 160, 162. The user may specify the firmware repository location at 164, and then the management gateway displays at 166 the firmware available for update for that device, and which may be good candidates for upgrade for the selected device. The management gateway may determine at 168 whether there is at least one firmware available for update. If no firmware is available for that device, a message is displayed at 170. If firmware is available for the device, the user selects the desired firmware from the displayed list of firmware at 172, and operation branches to 128.

In an exemplary embodiment, a decision of whether to update the firmware of a particular MFP or not may be based on a version matrix. A version matrix for a firmware may be stored along with the firmware in the firmware repository. An exemplary version matrix is a matrix of version numbers of all the firmware for different components of the MFP. It may also contain the interdependencies among the various components. For those MFP devices with multiple sub-components, where each component requires a separate firmware, there may be a need to update more than one firmware at the same time. The firmware for different components of an MFP device may have interdependencies. The firmware for different components may have dependency on the order in which the firmware for components is upgraded. Additionally they might have dependency across versions. A particular version of one component may only work with a particular version of firmware for another component. In an exemplary embodiment, the management gateway compares the existing version of the MFP firmware with the version matrix of the new firmware and decides whether the firmware for the MFP needs to be updated or not. An exemplary embodiment of this feature is illustrated in FIG. 3, including step 122.

An exemplary embodiment of a version matrix is a matrix of version numbers of all the firmware for different components of the whole system. It also contains the interdependencies among the various components. A representation of an exemplary version matrix is depicted in the following table.

| Components | Version |
| --- | --- |
| MFP Firmware | 7.0 |
| Print Engine Firmware | 7.0 |
| Copier Firmware | 7.0 |
| Scanner Firmware | 6.0 |

|  |  | | | | |
|---|---|---|---|---|---|
| Fax Firmware | | | 5.0 | | |
| Job Accounting Firmware | | | 4.0 | | |

| | | Constituent Firmware Components | | | |
|---|---|---|---|---|---|
| | | Print Engine 7.0 | Copier 7.0 | Scanner 6.0 | Fax 5.0 | Job Accounting 4.0 |
| Compatible Versions Of Components | Print Engine | | 5.0 or greater | | | 6.5 or greater |
| | Copier | 5.0 or greater | | | | 6.5 or greater |
| | Scanner | | | | 5.5 or less | 6.0 |
| | Fax | | | | | 5.0 |
| | Job Accounting | | | | | |

The first part of the table provides the version numbers of the firmware for different components. For example, the version of the released MFP firmware package is 7.0. In this example, the MFP firmware is made up five components—Print Engine firmware, Copier firmware, Scanner firmware, Fax firmware and Job Accounting Firmware. Components of the MFP may have different versions. In this case, even though the MFP firmware version is 7.0; the Fax firmware version is 5.0.

The bottom half of the table in this example of a version matrix provides the compatibility matrix of the version of components. The columns represent the versions of new firmware components. The rows show the versions of old firmware that are compatible with the new firmware versions shown in the columns. For example, Job Accounting version 4.0 in the new firmware is compatible with copier firmware version 6.5 or greater in the old releases.

The version matrix may be used in making decisions whether to update a particular component on not. For example, if a MFP has Job Accounting firmware with version 3.2 and printer firmware with version 6.7 and someone decides to update the firmware of Job Accounting to 4.0, then he also has to update the print engine firmware to 7.0; otherwise, the Job Accounting firmware will not work properly.

In an exemplary embodiment, a self-check mechanism may be provided to ensure that a firmware upgrade completes successfully. If there is a failure then retries will be made to upgrade the firmware. After certain number of retries, user will be notified on the failure of firmware upgrade. At that time user will have option to restore the old firmware on the MFP. An exemplary self-check mechanism is illustrated in FIG. 3 as steps 142-146.

Although the foregoing has been a description and illustration of specific embodiments of the subject matter, various modifications and changes thereto can be made by persons skilled in the art without departing from the scope and spirit of the invention as defined by the following claims.

What is claimed is:

1. A method for firmware updating for a plurality of electronic devices each connected on a user intranet behind a firewall, each of the plurality of electronic devices including firmware stored on device memory, the method comprising:
    maintaining a management gateway connected on the intranet behind a firewall and to the Internet through the firewall, the management gateway configured to control all firmware update activity for each of said plurality of electronic devices;
    maintaining an electronically accessible firmware repository for storing firmware updates, including firmware updates for said plurality of electronic devices;
    accessing the management gateway to establish a firmware update activity schedule for each of said plurality of electronic devices, said firmware update activity schedule including a location of firmware in the firmware repository, and a time schedule for conducting the firmware update activity;
    conducting a firmware update activity for each of said plurality of electronic devices in accordance with said time schedule;
    monitoring said firmware activity by the management gateway to determine whether the firmware update activity results in a successful firmware update for each of said plurality of electronic devices; and
    wherein said accessing the management gateway comprises receiving authorized electronic instructions at the management gateway through the firewall from a remote management console connected to the Internet at a remote site outside the firewall regarding updating the firmware of the plurality of electronic devices, and further comprising limiting access of the remote management console to only the management gateway while preventing access to the plurality of electronic devices and other devices installed on the network behind the firewall.

2. The method of claim 1, wherein said one or more electronic devices includes a plurality of multifunction printing (MFP) devices.

3. The method of claim 1, further comprising:
    maintaining a log of said firmware update activities.

4. The method of claim 1, wherein said management gateway is a software application installed on a server connected on the user intranet.

5. The method of claim 1, wherein said maintaining the firmware repository includes maintaining the firmware repository with firmware updates, said firmware updates including a version matrix associated with each firmware update.

6. The method of claim 1, further comprising:
    checking a version matrix associated with one device of said plurality of electronic devices to determine if said firmware update is compatible with said one device prior to conducting said firmware update activity, and
    conducting said firmware update activity for said one device only if said firmware update is compatible with said one device.

7. The method of claim 1, wherein said conducting a firmware update activity includes, for one device of said plurality of electronic devices,
pushing the firmware update onto said one device from the firmware repository.

8. The method of claim 1, wherein said conducting a firmware update activity includes, for one device of said plurality of electronic devices,
pulling the firmware update from the firmware repository by the one device.

9. The method of claim 1, wherein the firmware repository includes a firmware repository database maintained on a remote server outside the user intranet.

10. The method of claim 1, further comprising:
providing the remote management console at the remote site outside the user intranet and the firewall.

11. The method of claim 1, further comprising:
providing a user notification message indicating whether a firmware update has been successfully completed.

12. The method of claim 1, wherein said receiving instructions at the management gateway from a remote management console through said firewall comprises:
establishing a secure virtual tunnel through the firewall between the remote management console and the management gateway to provide a private and secure channel of communication between the remote management console and the management gateway; and
receiving said instructions through the secure virtual tunnel.

13. A method for firmware updating for a plurality of multifunction printing (MFP) devices connected on a user intranet, each of the plurality of MFP devices including firmware stored on device memory, the method comprising:
maintaining a management gateway connected on the intranet behind a firewall and to the Internet through the firewall, the management gateway configured to control all firmware update activity for said plurality of MFP devices;
maintaining an electronically accessible firmware repository for storing firmware updates, including firmware updates for said plurality of MFP devices;
accessing the management gateway to establish a firmware update activity schedule for each of said plurality of MFP devices, said firmware update activity schedule including a location of firmware in the firmware repository, and a time schedule for conducting the firmware update activity;
the management gateway initiating a firmware update activity of said plurality of MFP devices according to said firmware update activity schedule;
checking a version matrix associated with a firmware update for one device of said plurality of MFP devices to determine if said firmware update is compatible with said electronic device prior to conducting said firmware update activity, said version matrix comprising a matrix of version numbers of all the firmware for different components of said device and a set of interdependencies among the different components of said device; and
conducting said firmware update activity for said one device only if said firmware update is compatible with said one device; and wherein said accessing the management gateway comprises:
receiving electronic instructions at the management gateway from an Internet-connected remote management console through the firewall, said instructions regarding updating the firmware of the plurality of MFP devices, and
limiting access of the remote management console to only the management gateway while preventing access of the remote management console to the plurality of MFP devices and other devices installed on the network.

14. The method of claim 13, further comprising:
monitoring said firmware activity by the management gateway to determine whether the firmware update activity results in a successful firmware update for said MFP device.

15. The method of claim 13, wherein said one or more electronic devices includes a plurality of multifunction printing (MFP) devices.

16. The method of claim 13, further comprising:
maintaining a log of said firmware update activities.

17. The method of claim 13, wherein said management gateway is a software application installed on a server connected on the user intranet.

18. The method of claim 13, wherein said maintaining the firmware repository includes maintaining the firmware repository with firmware updates, said firmware updates including said version matrix associated with each firmware update.

19. The method of claim 13, wherein the firmware repository includes a firmware repository database maintained on a remote server outside the user network.

20. The method of claim 13, further comprising:
providing the remote management console at a remote site outside the user intranet and the firewall.

21. The method of claim 13, wherein said receiving instructions at the management gateway from a remote management console through said firewall comprises:
establishing a secure virtual tunnel through the firewall between the remote management console and the management gateway to provide a private and secure channel of communication between the remote management console and the management gateway.

22. The method of claim 21, wherein said establishing a secure virtual tunnel comprises:
initiating an outgoing connection through said firewall from the management gateway to the remote management console, and establishing the secure virtual tunnel after mutual authentication;
the method further comprising authorizing the remote management console for remote management of said plurality of MFP devices.

23. The method of claim 12, wherein said establishing a secure virtual tunnel comprises:
initiating an outgoing connection through said firewall from the management gateway to the remote management console, and establishing the secure virtual tunnel after mutual authentication;
the method further comprising authorizing the remote management console for remote management of said plurality of electronic devices.

* * * * *